United States Patent
Niemann et al.

(10) Patent No.: US 6,328,123 B1
(45) Date of Patent: Dec. 11, 2001

(54) ELECTRICAL DRIVE FOR A WHEEL HUB

(75) Inventors: Klaus Niemann, Welzheim; Tobias Polascheck, Rackwitz, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/124,030

(22) Filed: Jul. 29, 1998

(30) Foreign Application Priority Data

Jul. 29, 1997 (DE) .............................................. 197 32 637

(51) Int. Cl.$^7$ ........................................................ B60K 7/00
(52) U.S. Cl. ............................................ 180/65.5; 180/65.6
(58) Field of Search ............................... 180/65.1, 65.5, 180/65.6; 188/18 A, 72.4; 318/13; 301/36.1; 310/67 R

(56) References Cited

U.S. PATENT DOCUMENTS

| | | | |
|---|---|---|---|
| 1,552,155 | * 9/1925 | Hawley, Jr. ......................... | 310/67 R |
| 1,997,974 | 4/1935 | Moore et al. . | |
| 2,251,539 | * 8/1941 | Ash .................................... | 188/18 A |
| 2,631,308 | * 3/1953 | Hutchinson ........................ | 310/67 R |
| 3,000,470 | * 9/1961 | Milan ................................. | 188/18 A |
| 3,548,965 | * 12/1970 | Pierro ................................. | 180/65.5 |
| 3,812,928 | 5/1974 | Rockwell et al. .................. | 180/65.5 |
| 3,897,843 | 8/1975 | Hapeman et al. . | |
| 4,021,690 | * 5/1977 | Burton ............................... | 310/67 R |
| 4,467,230 | * 8/1984 | Rovinsky ........................... | 318/13 |
| 4,799,564 | * 1/1989 | Iijima et al. ....................... | 180/65.6 |
| 5,382,854 | * 1/1995 | Kawamoto et al. ................ | 180/65.6 |
| 5,600,191 | * 2/1997 | Yang ................................... | 180/65.5 |
| 5,685,798 | * 11/1997 | Lutz et al. .......................... | 180/65.5 |

FOREIGN PATENT DOCUMENTS

| | | | |
|---|---|---|---|
| 651148 | * 10/1937 | (DE) ................................... | 180/65.5 |
| 18 06022 | 5/1970 | (DE) . | |
| 21 09372 C3 | 9/1972 | (DE) . | |
| 3620363 | * 12/1987 | (DE) ................................... | 180/65.5 |
| 41 10638 A1 | 10/1992 | (DE) . | |
| 4421428C1 | 11/1994 | (DE) . | |
| WO 96/22895 | 7/1996 | (DE) . | |
| 0 249 808 | 12/1987 | (EP) . | |
| 0 253 999 | 1/1988 | (EP) . | |
| 0 582 563 | 2/1994 | (EP) . | |
| 2561593 | * 9/1985 | (FR) ................................... | 180/65.5 |
| 9-47003 | 2/1997 | (JP) . | |
| 09/05069 | * 5/1990 | (WO) ................................. | 301/36.1 |

OTHER PUBLICATIONS

Gesetzlich Vorschriften, "Bremsausrüstung", pp. 500, 506, and 526–527.

* cited by examiner

Primary Examiner—Frank Vanaman
(74) Attorney, Agent, or Firm—Crowell & Moring LLP

(57) ABSTRACT

An electrical drive for a wheel hub of a motor vehicle, especially a utility vehicle, is provided with an electric motor disposed inside of the wheel. The electric motor has a stator and a rotor, where the rotor is connected to a step-down transmission. Additionally, the drive is provided with a brake. The stator is disposed within the hollow rotor and the step-down drive is disposed within the stator.

5 Claims, 3 Drawing Sheets

ELECTRICAL DRIVE FOR A WHEEL HUB

BACKGROUND AND SUMMARY OF THE INVENTION

The invention relates to an electrical drive for a wheel hub of a motor vehicle, especially a utility vehicle, with an electric motor disposed within the wheel and having a stator and a rotor, the rotor being connected to a step-down transmission, and having a brake system.

A drive of this kind is disclosed in German patent document DE 41 10 638 A1. By means of the design described therein, the gear transmission, torque converter and drive shafts components are eliminated and thus weight and costs can be saved.

In this drive, however, the large axial width is disadvantageous. Due to the necessary elaboration of the design of this drive, which is represented simply schematically in the disclosure, the drive becomes even wider. If the drive is used in an omnibus, the large overall axial width of the drive results in a relatively narrow aisle for the passengers of the omnibus.

Another problem of the electrical drive represented in DE 41 10 638 A1 is its relatively low continuous power output which is too low for practical use of the omnibus. Attempts to improve the continuous power output of the electrical drive have only led to an additional increase of the overall width of the drive.

Other electrical drives for a wheel hub of a motor vehicle are disclosed in German patent documents DE-PS 21 09 372 and DE-OS 18 06 022. However, these drives also have the disadvantage of a large overall width together with a relatively low continuous power output.

It is an object of the present invention to provide an electrical drive for a wheel hub of a motor vehicle which has an adequate continuous power output and a relatively small overall width.

This and other objects and advantages are achieved by the electrical drive for a wheel hub of a motor vehicle, especially a utility vehicle, with an electric motor disposed within the wheel and having a stator and a rotor, the rotor being connected to a step-down transmission, and having a brake system according to the invention, in which a stator is disposed within a hollow rotor and the step-down transmission is disposed within the stator.

The arrangement of the reduction gear transmission within the stator results in a very small overall width of the electrical drive, since the latter is almost entirely integrated into the contour of the wheel. As a consequence, the electrical drive has an overall width that is slightly larger than the wheel itself. Thus, when the drive according to the invention is used in omnibuses, a substantial amount of room is left for a passenger aisle than was the case previously.

Since the stator is disposed within the rotor, the diameter of the rotor can be made very large. This results in a very large diameter of the air gap between the rotor and the stator. Ultimately, the electrical drive can have a very high power output. This furthermore results in a very high torque, so that the ratio of the step-down transmission can be relatively low.

Other objects, advantages and novel features of the present invention will become apparent from the following detailed description of the invention when considered in conjunction with the accompanying drawings.

DETAILED DESCRIPTION OF THE DRAWINGS

Figure 1:
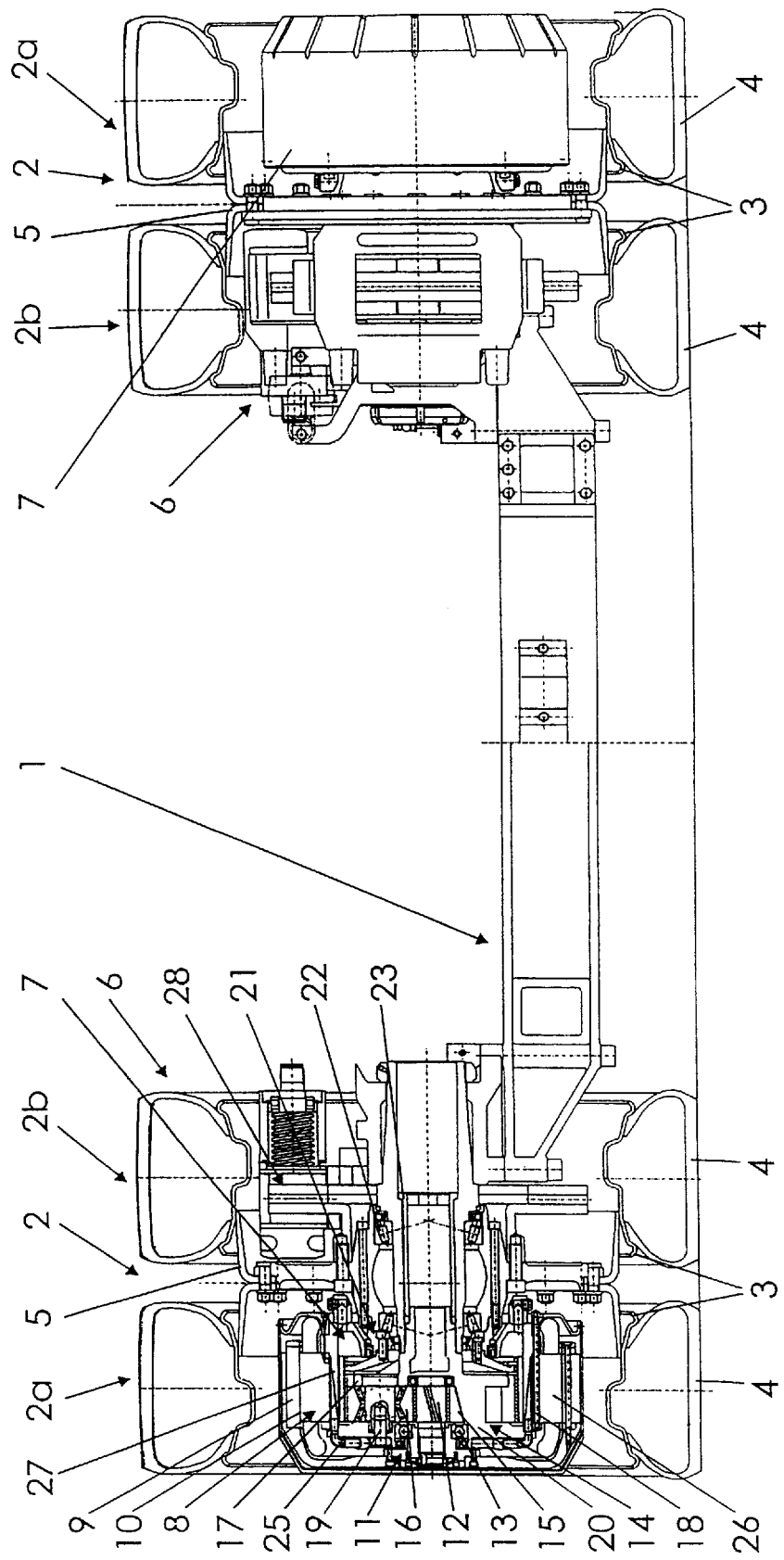
FIG. 1 shows a sectional view of an axle of a motor vehicle with the electrical drive according to the invention for a wheel hub.

FIG. 1 shows an axle 1 of a motor vehicle not further represented (e.g., an omnibus). In this figure, the hatching is omitted for the sake of clarity. At each end the axle 1 has wheels 2, which in this case are twin wheels 2. Each twin wheel has an outer wheel 2a and an inner wheel 2b. In a known manner, the wheels 2 have rims 3 and tires 4. On each end of the axle, the outer wheel 2a is joined to the inner wheel 2b by a hub 5.

Inside each of the wheels 2, there is an electrical drive 6 with an electric motor 7 which is situated substantially in the outer wheel 2b. The electric motor 7 is sectionally represented on the left end of the axle 1, and in the enclosed state on the right end of the axle 1.

Figure 2:
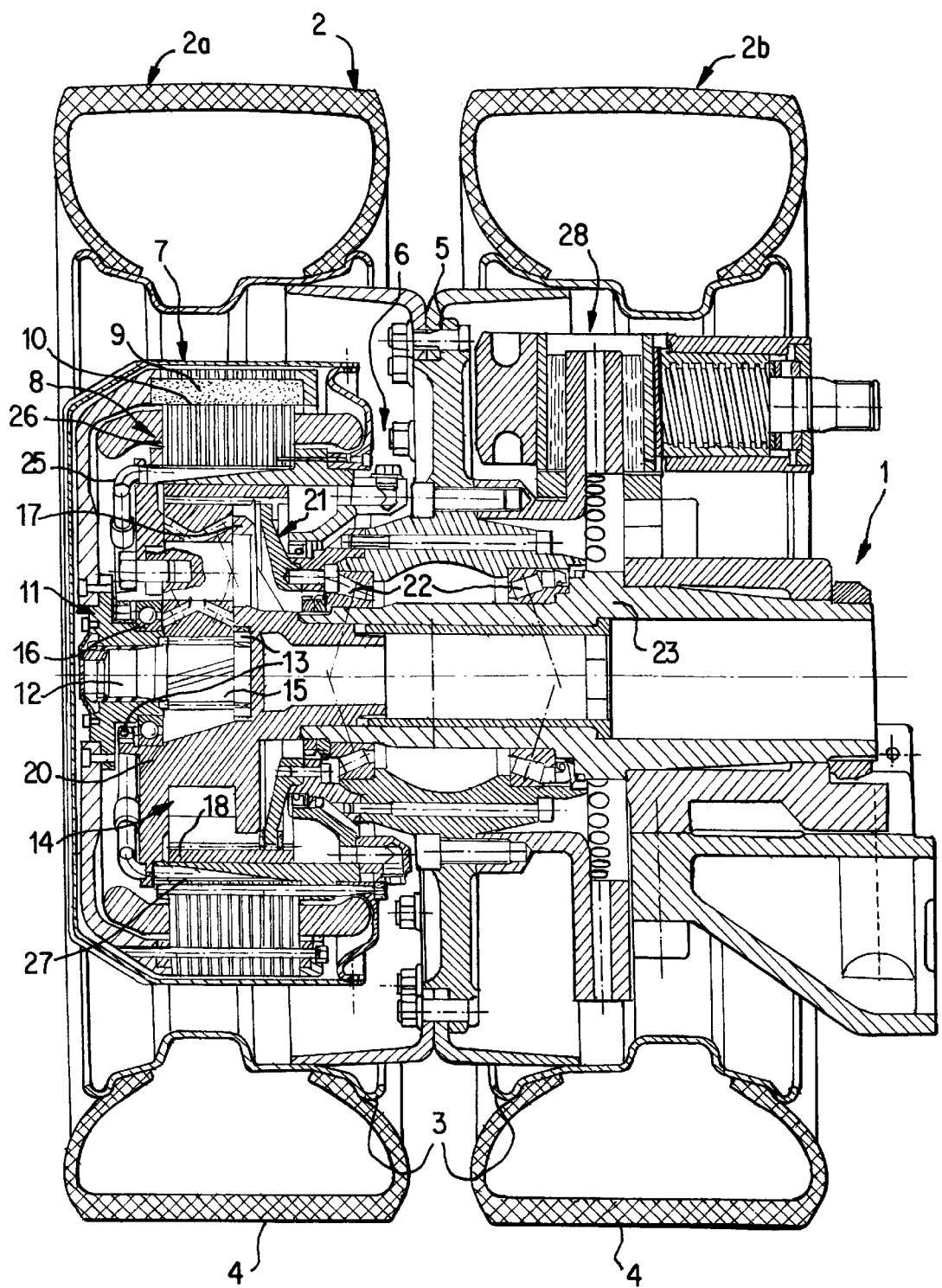
FIG. 2 is an enlarged representation of the electrical drive for a wheel hub of FIG. 1.
Figure 3:
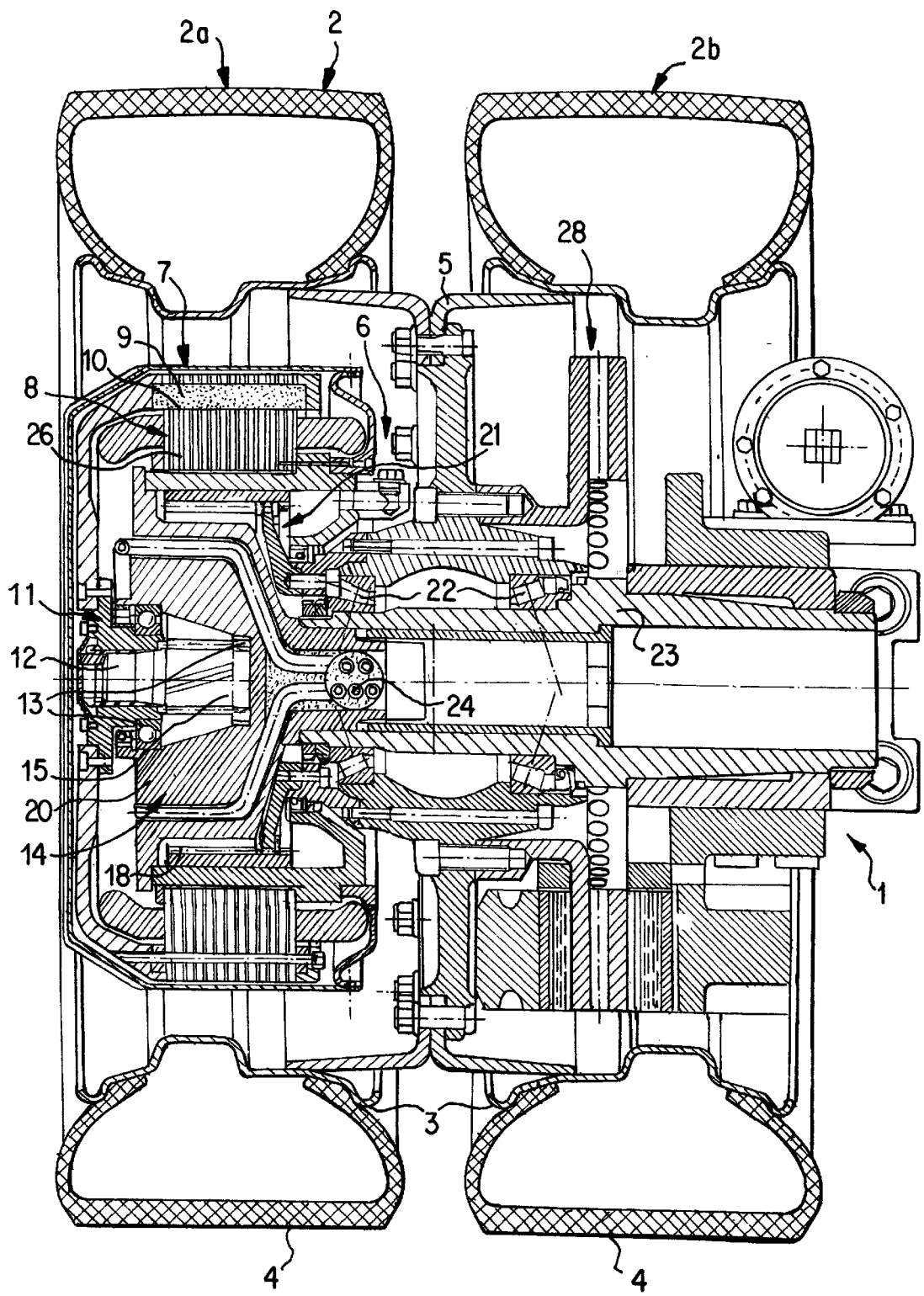
FIG. 3 is a sectional view (rotated 90°) of the electrical drive for a wheel hub represented in FIG. 2.

Since the individual components of the electric motor 7 are better seen in FIGS. 2 and 3 reference will be made hereinafter to these figures.

To achieve a rotary movement the electric motor 7 has a stator 8 and a rotor 9. The stator 8 is wound in a known manner and the rotor 9 is configured as a squirrel-cage rotor. In the embodiment represented in FIGS. 2 and 3, the electric motor 7 is thus an asynchronous three-phase motor. Of course, the rotor 9 can also be provided with permanent magnets (not shown), and the electric motor 7 can thus be configured as a synchronous or servo motor.

Contrary to designs which are common in electrical machine construction, the rotor 9 in the electric motor 7 is hollow and is disposed outside of the stator 8. Between the stator 8 and the rotor 9 is an air gap 10 whose surface plays an essential role in the power of the electric motor 7. Since the rotor 9 and thus also the air gap 10 has a very large diameter, due to the arrangement of the rotor 9 outside of the stator 8, the surface of the air gap 10 is inherently very large. This results in a high continuous power output from the electric motor 7. The rotor 9 is joined by a connecting element 11 to a pinion shaft 12 which is mounted in a roller bearing 13.

The stator 8 is hollow and in its interior is a step-down transmission in the form of a planetary drive 14. A sun gear 15 of the planetary drive 14 is disposed on the pinion shaft 12. The sun gear 15 is in engagement with planet gears 16 which are on a planet gear holder 17 and mesh with an internal gear 18.

The planet gear holder 17 is joined to a housing part 20 of the planetary drive 14, and thus is fixed. With this arrangement the planet gears 16 rotate about their own axis, which always remains in the same place, and transmit the rotary motion of the sun gear 15 to the internal gear 18.

Inasmuch as the basic construction of the planetary drive 14 as well as the teeth of the sun gear 15, the planetary gears 16 and the internal gear 18 (through which these components are in mesh with one another) are made in a known manner, they will not be further discussed.

The above-described construction of the electrical drive 6 results in a very small overall width. As a result, the width of the aisle in the omnibus in which the electrical drive 6 may be located can be substantial. The axle 1 is, for example, the farthest protruding component provided at an upper crosslink (not shown).

The large width of the aisle is additionally made possible by the fact that the electrical drive 6 is placed in the outer wheel 2a and very close to the outer end of the axle 1.

The wheel hub 5 is driven through an off-drive device 21 which is likewise engaged with the internal gear 18 through teeth. The off-drive device 21 thrusts through a tapered roller bearing 22 against a tubular shaft 23 of the axle 1.

Electrical conductors 24 and cooling water lines 25 are passed through the tubular shaft 23. The cooling water lines 25 serve to cool the clutch pack 26 of stator 8, so that the electric motor 7 can develop an even greater continuous power output. The housing part 20 has a circumferential annular gap 27 for bringing the cooling water through it.

Within the inner wheel 2b there is a brake 28 which (in this case) is in the form of a hydraulically operated disk brake. Since the brake 28 can apply substantially higher pressures for the same actuating force than a comparable air brake, the brake 28 requires very little space in the axial direction. This contributes to a further reduction of the size of the overall electrical drive 6. Since the design and the manner of operation of the brake 28 are generally known in the art, they will not be further discussed here.

Due to the arrangement of the electric motor 7 inside the outer wheel 2a and the brake 28 within the inner wheel 2b, space conflicts which exist in known wheel hub drives are thus eliminated on two different sides of the wheel hub 5.

The tires 4 are low profile tires, so that the rims 3 can have a greater diameter for the same outside diameter of the wheels 2. This permits a radial enlargement of the electrical drive 6 and thus an increase of its power output without thereby increasing its overall axial length.

The continuous power achievable with the above-described electric motor 7 can amount to about 100 kW per wheel hub 5, and the electric motor 7 can be supplied with power from an overhead trolley wire (not shown) or by a diesel-electric generator.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrical drive for a wheel hub of a motor vehicle, comprising:

an electric motor disposed within the wheel hub, the motor having a water-cooled stator and a hollow rotor;

a planetary transmission having a circumferential annular gap for water cooling the stator, said planetary transmission including an internal gear, a planetary gear holder on which planet gears are disposed, and a sun gear wherein the sun gear is connected to the hollow rotor, the internal gear is connected to the wheel hub, and the planetary gear holder is fixedly connected to a housing part; and a brake system;

wherein the stator is disposed within the hollow rotor, and the planetary transmission is disposed within the stator.

2. The electrical drive according to claim 1, wherein the electric motor is disposed on an outwardly facing side of the wheel hub in an outer wheel, and the brake system is disposed on an inwardly facing side of the wheel hub in an inner wheel.

3. The electrical drive according to claim 1, wherein the electric motor is a three-phase asynchronous motor, and the hollow rotor is a squirrel cage rotor.

4. The electrical drive according to claim 1, wherein the electric motor is a synchronous motor.

5. The electrical drive according to claim 1, wherein the brake system is a hydraulically operated disk brake.

* * * * *